United States Patent

[11] 3,602,599

| [72] | Inventors | Martin Polke<br>Cologne, Buchheim;<br>Wolfgang Stossel, Karlshuhe, both of, Germany |
|---|---|---|
| [21] | Appl. No. | 736,044 |
| [22] | Filed | June 11, 1968 |
| [45] | Patented | Aug. 31, 1971 |
| [73] | Assignee | Agfa-Gevaert Aktiengesellschaft<br>Leverkusen, Germany |
| [32] | Priority | June 16, 1967 |
| [33] | | Germany |
| [31] | | P 15 72 238.0 |

[54] ARRANGEMENT FOR DETERMINING PHOTOGRAPHIC EXPOSURE FACTORS
8 Claims, 5 Drawing Figs.

[52] U.S. Cl................................................. 356/206, 250/210, 356/222, 356/229
[51] Int. Cl..................................................... G01n21/22, G01s 1/42, G01s 1/10
[50] Field of Search........................................... 356/222, 206, 229; 250/210

[56] References Cited
UNITED STATES PATENTS

| 2,354,544 | 7/1944 | Rath.............................. | 356/222 X |
| 3,409,378 | 11/1968 | Shimomura.................. | 356/222 |
| 3,428,403 | 2/1969 | Konishi....................... | 356/222 |

Primary Examiner—Ronald L. Wibert
Assistant Examiner—Warren A. Sklar
Attorney—Michael S. Striker ABSTRACT: Exposure time and gradation of printing paper determined by use of small photoelectric resistance elements distributed over area of image. Half the resistance elements are connected in parallel, half in series. The elements are so distributed that each parallelly connected resistance element has a corresponding series element which receives substantially the same light. Current flow through the series combination influenced more by resistance elements receiving little light, while current flowing in the parallel combination will be influenced more by photoelectric elements receiving relatively much light. The difference between the currents flowing in the series and the parallel combinations constitutes a measure of the contrast in the negative.

INVENTOR.
MARTIN POLKE
WOLFGANG STÖSSEL

BY Michael S. Striker
Attorney

ARRANGEMENT FOR DETERMINING PHOTOGRAPHIC EXPOSURE FACTORS

BACKGROUND OF THE INVENTION

This invention relates to an arrangement for determining exposure factors for photographic printing by means of photoelectric scanning of the original.

Two factors of particular importance in photographic reproducing processes, are the exposure time, which depends mostly on the maximum density of the original, and the gradation of the printing material, or printing paper, which must be able to reproduce the density range of the original in a satisfactory manner.

In a conventional arrangement of this type, the maximum and minimum density of the original are determined by use of a densitometer and the exposure time and gradation of paper are chosen correspondingly. However this method requires a very thorough examination of the original and an experienced person for operating the printer. Other arrangements are known, wherein the range of contrast of an original is determined by means of a photoelectric measuring of the complete, original. In this type of arrangement photocells with nonlinear relationship between intensity of illumination and photocurrent are used. In general the measurement is conducted by comparing the photocurrent of a photocell illuminated in accordance with the original to that of a photocell illuminated diffusely through said same original. The difference between the two currents then constitutes a measure for the contrast. However the difference to be measured is very small, and the measurement therefore relatively difficult.

SUMMARY OF THE INVENTION

It is an object of this invention to furnish a particularly simple arrangement for determining exposure factors for photographic printing.

This invention constitutes an arrangement for determining exposure time and gradation of printing material for use in photographic printing apparatus adapted to print copies of a give original. It comprises means for creating at least one image of the original on an image plane. It further comprises a plurality of first photoelectric resistance elements, each responsive to the light corresponding to at least one predetermined area of said image, all of said first photoelectric resistance elements being connected together to form a series connection. A second plurality of photoelectric resistance elements, each responsive to substantially the same light as a corresponding one of said first photoelectric resistance elements, is connected together to form a parallel connection. Means are provided for generating a first measurement signal as a function of the resistance of said series connection, and, further, means are provided for generating a second measurement signal as a function of the total resistance of said parallel connection.

This invention allows the determination of exposure time and contrast for sufficient accuracy, without setting rigid requirements for the linearity of photocurrent with respect to intensity of illumination.

The main basis of the arrangement according to this invention is the realization, that the photoelectric resistance elements connected in parallel will have an overall resistance which is affected considerably by the portions of the image receiving much light, while the overall resistance of the series connected photoelectric resistance elements will be more affected by those portions of the original transmitting little light.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
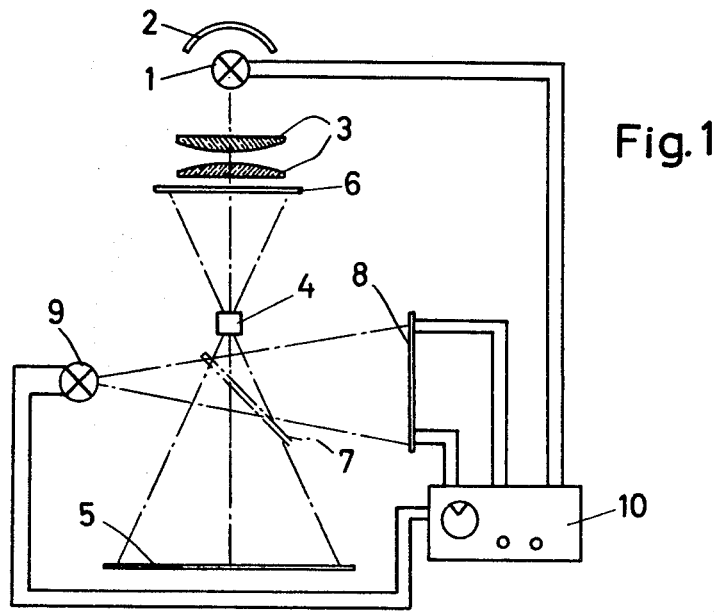
FIG. 1 shows a printer using the measuring arrangement according to this invention.

FIG. 1 is a schematic representation of a printer, consisting of a lamp 1, a reflector 2, a conventional double condenser 3, an objective 4, and a supporting surface 5 for carrying the printing material or printing paper. The original 6 is positioned in close proximity to the condenser 3, while a partially translucent mirror 7 is positioned behind the objective 4, at a 45° angle to the optical axis of the arrangement. This mirror causes an image of the original to be projected onto the measuring arrangement 8 which will be further described below. However this mirror is also adapted to project a diffuse light emanating from a lamp 9 arranged on the other side of the printer onto the printing paper 5. The diffuse light emanating from lamp 9 serves in conventional fashion to smooth the gradation of the printing paper by means of a preillumination below threshold value. Measuring arrangement 8, the light source 1 for illuminating the original, and the lamp 9 for the diffuse light are all connected over corresponding conductors to the illumination control apparatus 10.

Figure 2:
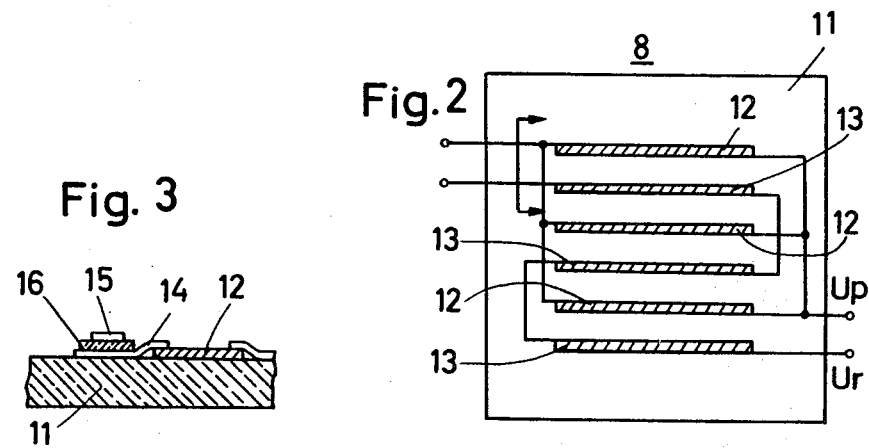
FIG. 2 is a more detailed view of that part of FIG. 1 showing the resistance elements.

FIG. 2 is a more detailed presentation of the measuring arrangement 8 of FIG. 1. A photoresistance element which is a good insulator in the dark is deposited upon a suitable base which must be a good insulator, in the form of strips. The photoelectric resistance elements may for example be cadmium-sulfide and may be deposited upon the insulator by means of an evaporation process. The thickness of the cadmium-sulfide strips should be large in relation to the depth of impingement of light. Thus, in response to illumination, the surface of the photoelectric resistance elements will first become conductive. Metallic electrodes, manufactured in an evaporation process, serve to connect the photoresistance elements 12 and 13 in such a manner that, for example, the first, third, fifth, etc. strip are connected in parallel, while the second, fourth, sixth, etc. are connected in series. The electrodes 14, used in conjunction with the photoelectric resistance elements which are connected in parallel are affixed to the lengthwise edges of the strips, while the electrodes 15, connecting the strips in series are connected only to the end faces of the appropriate strips. In places where the electrodes corresponding to the parallel connection and those corresponding to the series connection cross, appropriate insulating layers 16, for example $SiO_2$ may be provided.

Figure 3:
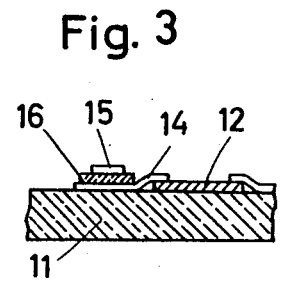
FIG. 3 is a cross section of part of the arrangement of FIG. 2.

A section view of this construction is shown in FIG. 3. Base 11 has deposited on it a cadmium-sulfide strip 12 which has contacts on both lengthwise edges. Where electrode 14 corresponding to the parallel connection, crosses electrode 15 corresponding to a series connection, an insulating layer 16 is provided. The size of the measuring arrangement 8 must correspond to the size of the print 5, thus setting an upper limit to the number of strips 12 and 13.

The overall resistance of the photoelectric resistance elements connected in parallel increases slightly with an increasing number of strips, that is for finer divisions. ($R_p$ = constant if the distance between individual strips were 0, since then the total cross section of the strips in parallel connection would be constant.)

However, the total resistance of the photoelectric resistance elements connected in series rises linearly with the length of the current path, and therefore increases considerably with an increasing number of strips.

Figure 4:
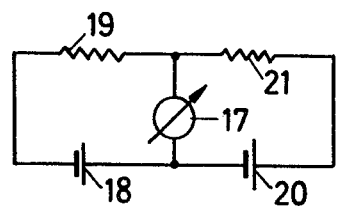
FIG. 4 is a circuit diagram of the measuring arrangement of FIG. 1.

FIG. 4 shows one embodiment of the circuit for measuring contrast by use of the series and parallel photoelectric resistance element connections. Here 19 is the equivalent resistance of those photoelectric resistance elements which are connected in parallel, while 21 represents the equivalent resistance of those photoelectric elements which are connected in series. A voltage source, here a battery 18 is used to supply the current to flow through resistance 19, while the voltage source, namely battery 20 is used to supply the current for the series connected resistances. Measuring means, here an ammeter 17 is connected in such a way that it measures the difference in current through the parallel and series resistance connections. Since the equivalent resistances are, as was discussed above, unequal, the batteries 18 and 19 must be adapted to furnish different voltages, if he the effect of parallel resistors 19 and series resistors 21 on the contrast measurement is to be the same. The arrangement shown in FIG. 4, though exceptionally simple, has the disadvantage that only a relatively low number of strips may be used in order to keep the equivalent resistances 19 and 21 with a sufficient range of each other so that equal currents can be achieved even with the use of unequal batteries 18 and 20.

In another embodiment of this invention, an arrangement containing only a few adjacent strips is moved across the image, and the maximum photo current resulting from use of the parallel connected strips and the minimum photocurrent resulting from use of the series connected strips are measured. These currents give a good indication of the range off contrast of the original.

If, however, one is willing to use a separate measuring instrument for each of the two photocurrents, then the number of areas at which the density of the original may be measured may be greatly increased, thus yielding a more accurate result. In particular good results may be obtained for originals consisting entirely of lines, that is for example written matter in which only two degrees of blackness obtained. The range of contrast, namely the difference in brightness between the areas which are not black and those having the maximum blackness, may be determined with relatively good accuracy.

The application of a measuring arrangement according to FIG. 2 for determining the exposure factors for the reproduction of a given original is indicated in FIG. 1. For example a simple measuring instrument according to FIG. 4 may be used to determine the range of contrast of the original. Determining this range of contrast becomes particularly simple if the voltages of the batteries 18 and 20 in FIG. 4 are so chosen, that the photocurrents $i_p$ and $i_r$ whose differences read on measuring instruments 17, cancel if all of the photoelectric resistance elements receive the same amount of light. At the same time the total exposure time may be determined by a separate evaluation of the current flowing through the series connection. Of course the difference between the two photocurrents is an indication of the contrast range of the original, and thus of the gradation of the printing paper to be used.

If a printing paper of maximum hardness is used, as is for example the practice in copying apparatus for roll film, then the indication of measuring instrument 17 of FIG. 4 may be used directly for controlling a lamp 9 (FIG. 1). This lamp, as explained above, serves to "solften" the paper by supplying a diffuse light over the whole image. This may be accomplished by means of a followup system connected to the pointer of the measuring instrument 17, or by mounting a compensating resistor in the circuit of the measuring instrument 17 on one axis with an adjustable resistor in the circuit of lamp 9. A means for adjusting the total exposure time may also be furnished at some knob of control apparatus 10.

Figure 5:
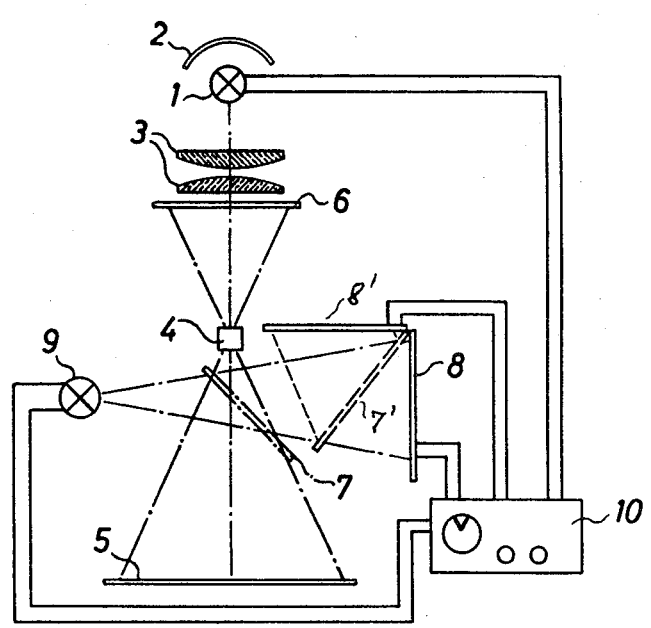
FIG. 5 shows the arrangement of FIG. 1 with an additional base and mirror.

Of course it is also possible to use the measured values to effect automatic control of both the exposure time and the gradation adjustment. Finally, it is possible to simplify the arrangement of the measuring means 8 of FIG. 2 by supplying two bases adjacent to each other, one of which contains the photoelectric resistance elements which are connected in series, while the other contains the photoelectric resistance elements which are connected in parallel. Of course, in this case further optical means must be provided, for example a partially translucent mirror, in order that each base receives an image corresponding to the same area of the original. This arrangement is shown in FIG. 5, which is identical to FIG. 1, except that the additional base and mirror, respectively labeled 8' and 7' are also shown.

It is also possible that the photoresistance elements and the corresponding electrodes are manufactured by a photographic etching technique.

It is further possible that each base is smaller than the image of the original, and that means, as for example a rotatable mirror, are provided to project the different areas of the original onto the base sequentially.

While the invention has been illustrated and described as embodied in photoelectric resistance elements manufactured by specified techniques, it is not intended to be limited to the details shown, since various modifications and structural and circuit changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptation should and are intended to be comprehended within the meaning and range of equivalence of the following claims.

What is claim as new and desired to be protected by Letters Patent is set for in the appended claims.

1. Arrangement for measuring the contrast in an original to be reproduced, comprising, in combination, means for creating at least one optical image of said original on an image plane; a plurality of series-connected photoelectric resistance elements, each mounted to receive light corresponding to the predetermined area of said image; a plurality of parallel-connected photoelectric resistance elements, each mounted to receive substantially the same light as a corresponding one of said series-connected photoelectric resistance elements; voltage supply means connected to said series-connected and said parallel-connected photoelectric resistance elements in such a manner that a first current flows through said series connected photoelectric resistance elements and a second current flows through said parallel-connected photoelectric resistance elements; and current-responsive measuring means connected between said series-connected photoelectric resistance elements and said parallel-connected photoelectric resistance elements in such a manner that the current flowing through said measuring means is a function of the difference between said first and second currents. whereby said current flowing through said measuring means is an indication of the contrast in the original to be reproduced.

2. An arrangement as set forth in claim 1, wherein said voltage supply means comprise a first voltage source connected to said series-connected photoelectric resistance elements, and a second voltage source connected to said parallel-connected photoelectric resistance elements.

3. An arrangement as set forth in claim 2, wherein said first voltage source supplies a voltage having a first amplitude and said second voltage source supplies a voltage having a second amplitude; and wherein the ratio of said first amplitude to said second amplitude is a function of the ratio of the equivalent resistance of said series-connected photoelectric resistance elements to the equivalent resistance of said parallel-connected photoelectric resistance elements under equal illumination of all of said photoelectric resistance elements.

4. An arrangement as set forth in claim 3, wherein the ratio of said first amplitude to said second amplitude is equal to the ratio of said equivalent resistance of said series-connected photoelectric resistance elements to the equivalent resistance of said parallel-connected photoelectric resistance elements under equal illumination of all of said photoelectric resistance elements.

5. An arrangement as set forth in claim 1, wherein said means for creating at least one optical image of the original comprises means for creating two optical images of the original; a first base, having a first surface, said first surface coinciding substantially with said first image, said parallel connection of second photoelectric resistance elements being arranged on said first surface; and a second base having a second surface, said second surface substantially coinciding with said second image, said series connection of first photoelectric resistance elements being arranged on said second surface.

6. An arrangement as set forth in claim 1, wherein said photoelectric resistance elements constitute etching on a surface.

7. An arrangement as set forth in claim 1, wherein said photoelectric resistance elements constitute evaporated metal films on a surface.

8. A system as set forth in claim 1 wherein the area of said original covered by all of said series-connected photoelectric resistance elements simultaneously is less than the image area corresponding to the total area of said original; also comprising means for projecting sequentially images corresponding to different areas of said original upon said photoelectric resistance elements, until images corresponding to the whole area of said original have been so applied.